United States Patent
Kang et al.

(10) Patent No.: US 10,679,100 B2
(45) Date of Patent: *Jun. 9, 2020

(54) SYSTEMS AND METHODS FOR INTELLIGENTLY CURATING MACHINE LEARNING TRAINING DATA AND IMPROVING MACHINE LEARNING MODEL PERFORMANCE

(71) Applicant: Clinc, Inc., Ann Arbor, MI (US)

(72) Inventors: Yiping Kang, Ann Arbor, MI (US); Yunqi Zhang, Ann Arbor, MI (US); Jonathan K. Kummerfeld, Ann Arbor, MI (US); Parker Hill, Ann Arbor, MI (US); Johann Hauswald, Ann Arbor, MI (US); Michael A. Laurenzano, Ann Arbor, MI (US); Lingjia Tang, Ann Arbor, MI (US); Jason Mars, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,978

(22) Filed: Apr. 10, 2019

(65) Prior Publication Data

US 2019/0294925 A1 Sep. 26, 2019

Related U.S. Application Data

(63) Continuation of application No. 16/143,773, filed on Sep. 27, 2018, now Pat. No. 10,303,978.
(Continued)

(51) Int. Cl.
*G06N 5/04* (2006.01)
*G06K 9/62* (2006.01)
(Continued)

(52) U.S. Cl.
CPC ....... *G06K 9/6256* (2013.01); *G06F 16/3329* (2019.01); *G06N 5/04* (2013.01); *G06N 20/00* (2019.01)

(58) Field of Classification Search
CPC ........ G06K 9/6256; G06N 20/00; G06N 5/04; G06F 16/3329
See application file for complete search history.

(56) References Cited

U.S. PATENT DOCUMENTS

| 4,516,201 A | 5/1985 | Warren et al. |
| 5,371,807 A | 12/1994 | Register et al. |

(Continued)

FOREIGN PATENT DOCUMENTS

| WO | 2015192239 A1 | 12/2015 |
| WO | 2017184587 A1 | 10/2017 |

OTHER PUBLICATIONS

Adina Williams, Nikita Nangia, and Samuel R. Bowman, "A Broad-Coverage Challenge Corpus for Sentence Understanding through Inference", Feb. 19, 2018, arXiv, pp. 1-11. (Year: 2018).*
(Continued)

*Primary Examiner* — Kamran Afshar
*Assistant Examiner* — Ying Yu Chen
(74) *Attorney, Agent, or Firm* — Padowithz Alce

(57) ABSTRACT

Systems and methods of intelligent formation and acquisition of machine learning training data for implementing an artificially intelligent dialogue system includes constructing a corpora of machine learning test corpus that comprise a plurality of historical queries and commands sampled from production logs of a deployed dialogue system; configuring training data sourcing parameters to source a corpora of raw machine learning training data from remote sources of machine learning training data; calculating efficacy metrics of the corpora of raw machine learning training data,
(Continued)

wherein calculating the efficacy metrics includes calculating one or more of a coverage metric value and a diversity metric value of the corpora of raw machine learning training data; using the corpora of raw machine learning training data to train the at least one machine learning classifier if the calculated coverage metric value of the corpora of machine learning training data satisfies a minimum coverage metric threshold.

17 Claims, 6 Drawing Sheets

Related U.S. Application Data

(60) Provisional application No. 62/648,318, filed on Mar. 26, 2018.

(51) Int. Cl.
    G06N 20/00      (2019.01)
    G06F 16/332     (2019.01)

(56) References Cited

U.S. PATENT DOCUMENTS

| | | | |
|---|---|---|---|
| 5,727,950 | A | 3/1998 | Cook et al. |
| 6,374,226 | B1 | 4/2002 | Hunt et al. |
| 6,455,991 | B2 | 9/2002 | Tsuji |
| 6,456,991 | B1 | 9/2002 | Srinivasa et al. |
| 7,769,705 | B1 | 8/2010 | Luechtefeld |
| 7,792,353 | B2 | 9/2010 | Forman et al. |
| 8,069,131 | B1 | 11/2011 | Luechtefeld et al. |
| 8,090,085 | B2 | 1/2012 | Di et al. |
| 8,140,450 | B2 | 3/2012 | Porikli et al. |
| 8,738,365 | B2 | 5/2014 | Ferrucci et al. |
| 8,825,533 | B2 | 9/2014 | Basson et al. |
| 8,898,098 | B1 | 11/2014 | Luechtefeld |
| 8,934,619 | B2 | 1/2015 | Di Fabbrizio et al. |
| 9,112,976 | B2 | 8/2015 | Phelps et al. |
| 9,189,742 | B2 | 11/2015 | London |
| 9,489,625 | B2 | 11/2016 | Kalns et al. |
| 9,552,549 | B1 | 1/2017 | Gong et al. |
| 9,862,245 | B2 | 1/2018 | Kim |
| 9,886,953 | B2 | 2/2018 | Lemay et al. |
| 10,528,453 | B2 * | 1/2020 | Kochura ............... G06N 20/00 |
| 2002/0083068 | A1 | 6/2002 | Quass et al. |
| 2004/0128624 | A1 | 7/2004 | Arellano et al. |
| 2006/0166174 | A1 | 7/2006 | Rowe et al. |
| 2007/0038609 | A1 | 2/2007 | Wu |
| 2007/0185896 | A1 | 8/2007 | Jagannath et al. |
| 2009/0030800 | A1 | 1/2009 | Grois |
| 2009/0204386 | A1 | 8/2009 | Seligman et al. |
| 2010/0121808 | A1 | 5/2010 | Kuhn |
| 2011/0125734 | A1 | 5/2011 | Duboue et al. |
| 2011/0231182 | A1 | 9/2011 | Weider et al. |
| 2013/0031476 | A1 | 1/2013 | Coin et al. |
| 2013/0185074 | A1 | 7/2013 | Gruber et al. |
| 2013/0288222 | A1 | 10/2013 | Stacy et al. |
| 2014/0108308 | A1 | 4/2014 | Stout et al. |
| 2014/0337266 | A1 | 11/2014 | Kalns et al. |
| 2015/0286955 | A1 | 10/2015 | Virkar et al. |
| 2015/0310858 | A1 | 10/2015 | Li et al. |
| 2015/0339590 | A1 * | 11/2015 | Maarek ................ H04L 67/02 706/12 |
| 2015/0382047 | A1 | 12/2015 | Van Os et al. |
| 2016/0019469 | A1 | 1/2016 | Petrov |
| 2016/0026634 | A1 * | 1/2016 | Allen ................ G06N 5/02 707/740 |
| 2016/0048772 | A1 * | 2/2016 | Bruno ................ G06N 5/04 706/11 |
| 2016/0063389 | A1 | 3/2016 | Fuchs et al. |
| 2016/0070992 | A1 | 3/2016 | Fujii |
| 2016/0260436 | A1 | 9/2016 | Lemay et al. |
| 2017/0124487 | A1 | 5/2017 | Szeto et al. |
| 2017/0160813 | A1 | 6/2017 | Divakaran et al. |
| 2017/0206152 | A1 | 7/2017 | Kochura et al. |
| 2017/0300831 | A1 | 10/2017 | Gelfenbeyn et al. |
| 2018/0047388 | A1 | 2/2018 | Tyagi et al. |
| 2018/0225373 | A1 * | 8/2018 | Alba ................ G06F 7/08 |
| 2018/0365212 | A1 | 12/2018 | Banerjee et al. |
| 2019/0235831 | A1 | 8/2019 | Bao |

OTHER PUBLICATIONS

Hosein Azarbonyad, Mostafa Dehghani, Tom Kenter, Maarten Marx, Jaap Kamps, and Maarten de Rijke, "Hierarchical Re-estimation of Topic Models for Measuring Topical Diversity", Jan. 16, 2017, arXiv, pp. 1-12. (Year: 2017).*

Marius Kaminskas and Derek Bridge, "Diversity, Serendipity, Novelty, and Coverage: A Survey and Empirical Analysis of Beyond-Accuracy Objectives in Recommender Systems", Dec. 2016, ACM Transactions on Interactive Intelligent Systems, vol. 7, No. 1, Article 2, pp. 1-42. (Year: 2016).*

International Search Report and Written Opinion for PCT Application No. PCT/US17/58995 dated Feb. 1, 2018.

International Search Report and Written Opinion for PCT Application No. PCT/US17/63034 dated Feb. 12, 2018.

International Search Report and Written Opinion for PCT Application No. PCT/US18/20857 dated Apr. 24, 2018.

Cao, Huanhuan , et al., "Context-Aware Query Clasification", ACM SIGIR'09, Jul. 19-23, 2009.

Deng, L. , "Ensemble deep learning for speech recognition", In Fifteenth Annual Conference of the International Speech Communication Association. (Year: 2014).

Graesser, Arthur C., et al., "AutoTutor: A tutor with dialogue in natural language", Behavior Research Methods, Instruments & Computers 2004, 36 (2), pp. 180-192.

Graesser, Arthur C., et al., "Intelligent Tutoring Systems with Conversational Dialogue", AI Magazine vol. 22, No. 4 (2001) (© AAAI), pp. 39-52.

John, G. H., Kohavi , et al., "Irrelevant features and the subset selection problem", In Machine Learning Proceedings, 1994 (pp. 121-129).

Kinnunen, T. , et al., "Real-time speaker identification and verification", IEEE Transactions on Audio, Speech, and Language Processing, 14(1), 277-288. (Year: 2006).

Lin, Shih-Wei , et al., "Particle swarm optimization for parameter determination and feature selection of support vector machines. ScienceDirect, Expert Systems with Applications 35 (2008) 1817-1824".

Litman, Diane J., et al., "ITSPOKE: An Intelligent Tutoring Spoken Dialogue System", HLT-NAACL—Demonstrations 04 Demonstration Papers at HTL-NAACL, pp. 5-8, May 2-7, 2004.

Sakagami, Y. , et al., "The intelligent ASIMO: System overview and integration", IEEE/RSJ International Conference on Intelligent Robots and Systems Sep. 30-Oct. 4, 2002, pp. 2478-2483.

Zhang, X.L. , et al., "Boosting contextual information for deep neural network based voice activity detection", IEEE/ACM Transactions on Audio, Speech and Language Processing (TASLP), 24(2), 252-264. (Year: 2016).

Zhang, X.L. , et al., "Deep belief networks based voice activity detection", IEEE Transactions on Audio, Speech, and Language Processing, 21(4), 697-710. (Year: 2013).

Har-Peled, Sariel , et al., "Constraint Classification for Multiclass Classification and Ranking", 2003 [Online] Downloaded Sep. 23, 2019 http://papers.nips.cc/paper/2295-constraint-classification-for-multiclass-classification-and-ranking.pdf (Year: 2003).

Serban, Julian V., et al., "A Deep Reinforcement Learning Chatbot", Montreal Institute for Learning Algorithms, Montreal, Quebec, Canada, arXiv preprint arXiv: 1709.02349, Nov. 5, 2017.

* cited by examiner

Constructing a Machine Learning Test Corpus S210

Sourcing Machine Learning Training Data S215

Analyzing Raw Machine Learning Training Data S220

Measuring an Accuracy of ML Test Set S230

Tuning Training Data Sourcing Parameters S240

Processing the Machine Learning Training Data S250

Deploying the Machine Learning Training Data S260

FIGURE 2

SYSTEMS AND METHODS FOR
INTELLIGENTLY CURATING MACHINE
LEARNING TRAINING DATA AND
IMPROVING MACHINE LEARNING MODEL
PERFORMANCE

CROSS-REFERENCE TO RELATED APPLICATIONS

This application is a continuation of U.S. application Ser. No. 16/143,773, filed 27 Sep. 2018, which claims the benefit of U.S. Provisional Application Ser. No. 62/648,318, filed 26 Mar. 2018, all of which are incorporated herein their entireties by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the machine learning field, and more specifically to a new and useful system and method for intelligently training machine learning models in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
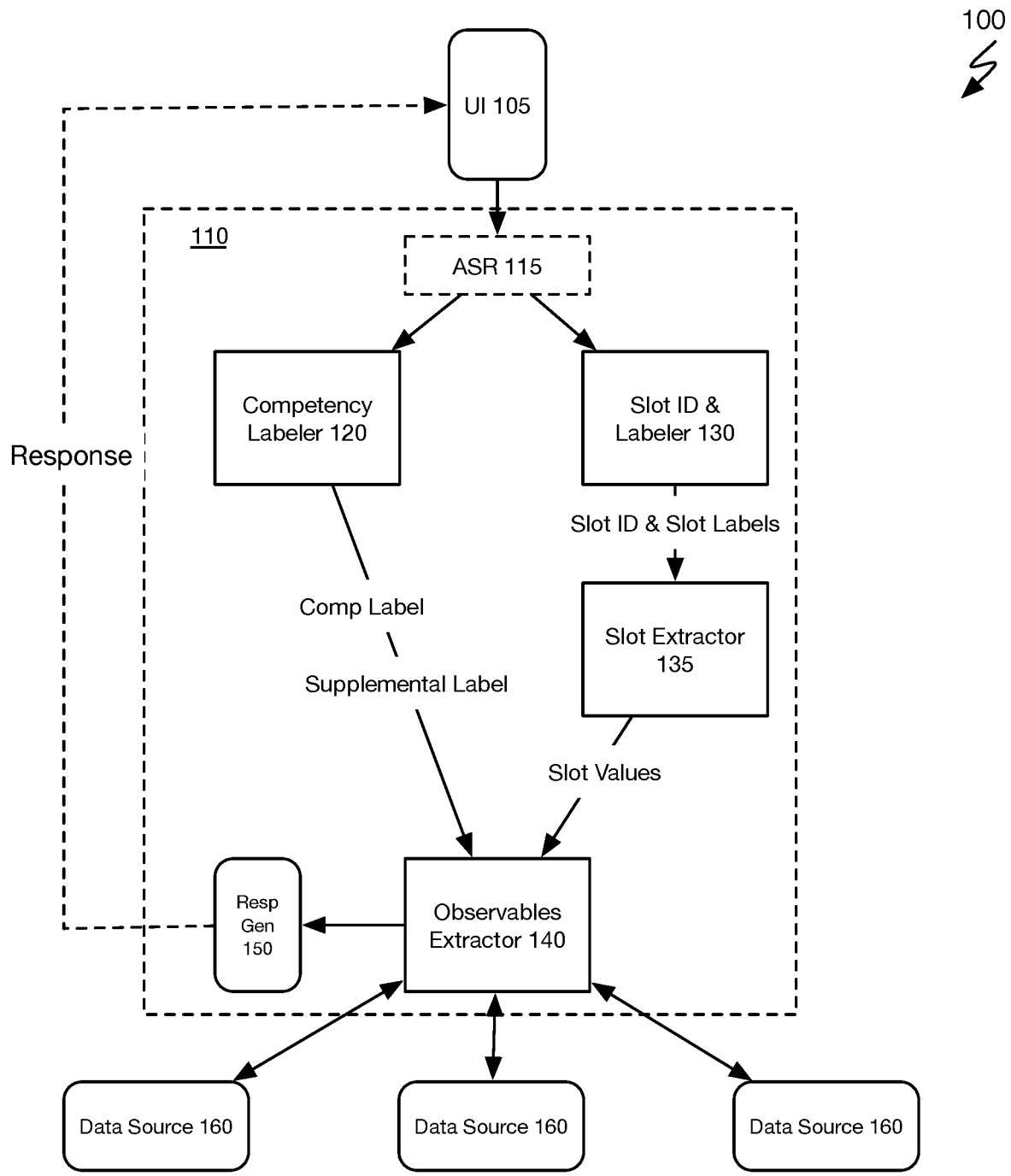
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly-defined intents. This inflexible structure cannot reasonably and efficiently address the many variances in the manners in which a user may pose a query or command to the virtual assistant.

The embodiments of the present application, however, provide artificial intelligence virtual assistant platform (e.g., an artificially intelligent dialogue system) and natural language processing capabilities that function to process and comprehend structured and/or unstructured natural language input from a user or input from any other suitable source. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly-defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, a machine learning model configuration and management console of one or more embodiments of the present application enable a rapid and efficient training of machine learning models employed in the artificially intelligent virtual assistant.

Additionally, the one or more embodiments provide systems and techniques for intelligently curating large volumes of machine learning data for dialogue systems with limited access to sufficient training data. The one or more embodiments detail one or more training data sourcing techniques that may function to reduce training requirements of machine learning models of a deployed system. In some embodiments, the one or more techniques provide intelligence with respect to a quality of collected training data and whether the training data will function to improve one or more machine learning models without actually training the one or more machine learning models with the collected training data. Accordingly, a technical benefit of one or more of these embodiments include a significant reduction in the training of machine learning models with sub-optimal and/or poor quality training data and reduction in use of computing resources including memory and computer processing power because of the one or more embodiments enable a reduction in training requirements for machine learning models.

Intelligent Machine Learning Training Data Curation

Further, it may be additionally recognized in the artificially intelligent dialogue systems space that large volumes of training data are typically required for deploying high performance machine learning models in such dialogue systems. While some entities that implement and/or deploy these dialogue systems have access to large volumes of training data based data that may be accessible from related and well-developed systems and platforms, this is not the case for entities without such advantages. Thus, a lack of accessibility and/or availability of large volumes of training data for newly developing and/or relatively newly deployed artificially intelligent dialogue systems appears to be a significant hurdle.

The one or more embodiments of the present application, however, provide systems and techniques that enables an intelligent and efficient sourcing of large volumes of training data as well as one or more systems and techniques that enable an intelligent curation of training data for the purposes of implementing a highly performant artificially intelligent dialogue system.

As described in more detail below, one or more embodiments of the present application disclose intelligent training data sourcing methods (e.g., data collection methods). As detailed in one or more of the embodiments herein, the systems and methods function to configure one or more sourcing parameters including for constructing appropriate prompt compositions and mixtures for collecting a most optimal training data set from one or more training data sources including remote crowdsourcing platforms.

Additional embodiments of the present application provide systems and methods that enable intelligent measures of performance and measures of efficacy of the collected training data without having to train and measure an accuracy of a subject machine learning model. These intelligent measures may additionally function to inform an optimal curation of the training data.

1. System for Intelligently Curating Machine Learning Training Data for Improving Performance Metrics of a Machine Learning Model As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140.

Figure 1A:
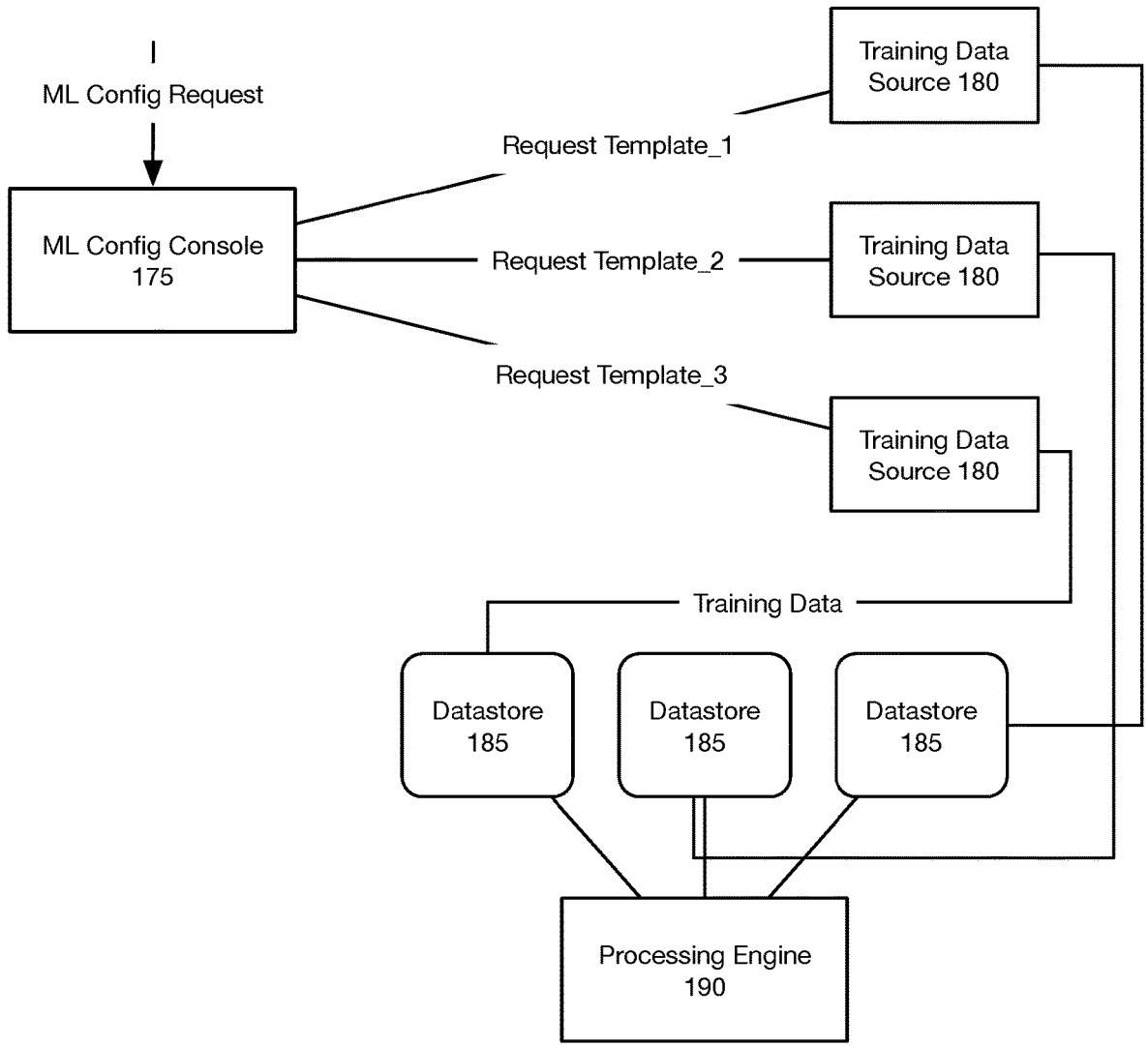
FIG. 1A illustrates a schematic representation of a subsystem of system 100 in accordance with one or more embodiments of the present application.

As shown in FIG. 1A, a subsystem 170 for intelligently training and/or configuring a machine learning model includes a machine learning model configuration and management console 175, a plurality of external training data sources 180, a plurality of datastores 185, and a training data processing engine 190.

The machine learning model configuration and management console 175 preferably functions to provide a user interface that may be in operable communication and/or configurational control of one or more components of the subsystem 170 as well as the artificially intelligent conversational system 100. The machine learning configuration and management console 175 preferably enables an administrator of a machine learning system or environment to perform configuration updates to one or more machine learning models of the machine learning system and/or configure new machine learning models into the machine learning system. The management console 175 may be implemented by one or more private or public (hardware) computing servers and/or computing servers of a distributed computing system (e.g., the cloud).

The plurality of external training data sources 180 preferably include several disparate sources of labeled training data that may be used for training machine learning models. For instance, the plurality of external training data sources 180 may include a crowdsourcing data platform, such as Amazon Mechanical Turk or the like, in which labeled data is sourced from a number of data sources or users into the crowdsourcing data platform.

The plurality of datastores 185 may function to collect and store machine learning training data from the plurality of external training data sources 180.

The training data processing engine 190 may function to process the raw training data samples collected from the plurality of external training data sources 180 into a refined or finished composition or list of training data samples that may be deployed into an operational or live machine learning model of the system 100.

Generally, the system 100 functions to implement the artificial intelligence virtual assistant platform no to enable intelligent and conversational responses by an artificially intelligent virtual assistant to a user query and/or user command input into the system 100. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, $C_{4.5}$, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workboats, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Intelligently Curating Machine Learning Training Data for Improving Performance Metrics of a Machine Learning Model As shown in FIG. 2, a method 200 for intelligently and automatically sourcing and curating machine learning training data includes constructing a machine learning test corpus S210, sourcing machine learning training data S215, measuring one or more efficacy metrics of a corpora of raw machine learning training data S220, measuring an accuracy of a set of machine learning models S230, tuning one or more parameters of the machine learning training data sourcing technique S240, processing the machine learning training data S250, and deploying the machine learning training data S260.

The method 200 functions to enable intelligent techniques and system for sourcing large volumes of machine learning training data and additional systems and techniques that enable intelligent curation for building a highly performant artificially intelligent dialogue system, as described in U.S. patent application Ser. No. 15/797,414 and U.S. patent application Ser. No. 15/821,010, which are both incorporated in their entireties in this application by this reference.

2.1 Constructing Machine Learning Test (Baseline) Sets

S210, which includes constructing a machine learning test corpus, functions to generate a machine learning test corpus for each of a plurality of distinct classification intents (e.g., classification categories, predefined categories, sub-categories, etc.) and/or for each of a plurality of machine learning classifiers. Preferably, a machine learning test corpus comprises a plurality of sentences (e.g., statements, queries, and/or commands with or without punctuation, etc.) defining a machine learning testing set for one or more classification intents of artificially intelligent dialogue system. That is, for a given dialogue system an intent classification task includes receiving user utterance as input and classifies the user utterance into one of a plurality of predefined categories.

In some embodiments, the machine learning test corpus may function as a baseline for evaluating one or more quality metrics or performance metrics of raw or unrefined machine learning training data. Additionally, or alternatively, the machine learning test corpus may function as machine learning training input for an initial training of a machine learning algorithm. In some embodiments, a plurality of distinct machine learning test corpus (i.e., a corpora of machine learning test corpus) may be defined for evaluating a plurality of distinct corpus of raw machine learning training data and/or for training a plurality of distinct machine learning algorithms.

Figure 3:
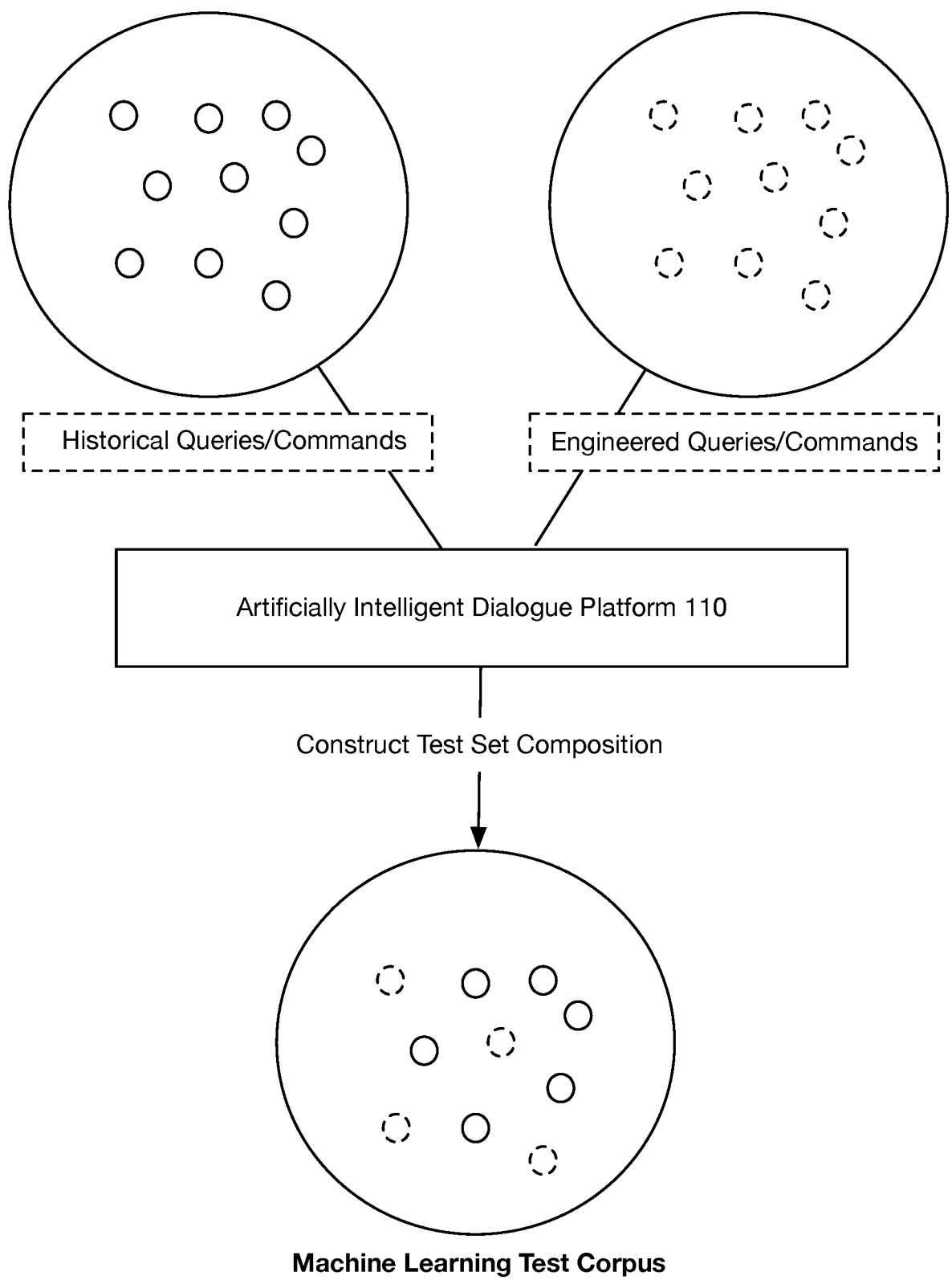
FIG. 3 illustrates a schematic representation of a system and process for constructing a machine learning test corpus in accordance with one or more embodiments of the present application.

S210, in some embodiments, may function to construct a machine learning test corpus using historical user queries or commands from a deployed (dialogue) system, as shown by way of example in FIG. 3. For instance, S210 may function to collect a plurality of user queries or user commands from a deployed artificially intelligent dialogue system by test sampling from the production logs of the deployed system. Accordingly, the production logs of such deployed system may include thousands or millions of historical user queries or user commands posed to or provided as input into the deployed system. It shall be noted that S210 may function to construct the machine learning test corpus using sampled data from any suitable user logs, systems or repositories having real user query and/or user command data including, from recordings or transcripts between a user and a representative or agent of an entity (e.g., a customer service agent).

In some embodiments, S210 may function to construct a machine learning test corpus based on artificial and/or engineered queries or commands. In such embodiments, a plurality of distinct sentences (test datum) may be engineered by one or more skilled artisans (e.g., developers, engineers, etc.) of an artificially intelligent deployed system or the like. Accordingly, in such embodiments, one or more ideal (or prototypical) user queries and/or one or more user commands may be manually-generated by an engineer or developer associated with the deployed system. The engineered user queries and/or user commands preferably include queries and/or commands that are distinct from the real user queries and/or real user commands of a deployed system. In some embodiments, the engineered user queries and/or user commands may be variations (or enhancements) of real user queries and/or real user commands.

Additionally, or alternatively, S210 may function to configure a mixture of a machine learning test corpus to include a combination of historical user queries and/or user commands from a deployed system and engineered user queries and/or user commands. An initial composition of the mixture of the machine learning test corpus may be based on predetermined proportions or ratios for each of the historical queries and/or commands and the engineered queries and/or commands. For example, historical (real) user queries from a deployed system may form 70% of a mixture or composition of a machine learning test corpus and the engineered queries may form the remaining 30% of the mixture of the machine learning test corpus.

In some embodiments, a desired composition of a mixture of a machine learning test corpus may be set such that S210 may function to automatically populate the machine learning test corpus with a number of historical queries and/or commands and engineered queries and/or commands according to pre-selected proportions (e.g., 60% historical, 40% engineered, etc.). In such embodiments, S210 may function to test sample a historical database or repository of a deployed system to meet or satisfy the selected proportion for historical queries and/or commands and function to automatically engineer or pull from a database of engineered queries and/or commands to satisfy the predefined proportion for engineered queries and/or engineered commands.

Additionally, or alternatively, in a machine learning test corpora in which a plurality of distinct machine learning test corpus define the corpora, S210 may function to augment each of the distinct corpus with intent or classification labels (or metadata) corresponding to one or more prescribed intents (i.e., classification intent labels).

2.2 Configuring Training Data Sourcing Parameters and Sourcing Training Data S215, which includes sourcing machine learning training data, functions to enable a configuration and/or setting of one or more training data sourcing parameters for sourcing a corpora of raw machine learning training data from one or more sources (e.g., one or more crowdsourcing platforms, etc.) of training data. The one or more training data sourcing parameters for sourcing the corpora of training data preferably include classification intent-specific descriptions, prompts, or examples that define a scope for sourcing and/or generating suitable training data for a given intent classification task and/or an intent-specific machine learning model (classifier). Preferably, S215 functions to source the corpora of raw machine learning training data for training and improving one or more machine learning algorithms used in implementing an artificially intelligent dialogue system (e.g., system 100) or the like from one or more remote crowdsourcing platforms. However, it shall be noted that S215 may be implemented to configure training data sourcing parameters for sourcing machine learning training data for any suitable system or the like that implement machine learning algorithms for performing classification tasks and/or inference tasks based on any suitable input values.

In a preferred embodiment, a corpora of raw machine learning training data includes a plurality of distinct corpus of machine learning training data. In such embodiment, each of the plurality of distinct corpus of machine learning training data may be generated and/or collected for the purposes of training an ensemble of distinct machine learning classifiers used for classifying user utterances or user input in a deployed dialogue system. For instance, a corpora of raw machine learning training data may include forty-seven (47) distinct corpus of machine training data, for example, for training 47 distinct machine learning classifiers implemented within a deployed dialogue system or the like. In such example, each of the 47 distinct machine learning classifiers may be implemented for categorizing and/or classifying user input according to one of the 47 distinct classification intents of the deployed system.

In some embodiments, S215 may additionally function to define a set of prompts (seed samples) for sourcing raw machine learning training data for each of a plurality of intent classification tasks and/or for each distinct machine learning classifier of an artificially intelligent dialogue system. In some embodiments, the set of prompts may be engineered based on a definition and/or specification of an intent classification task or the like. For instance, an engineer or a developer associated with a dialogue system may function to generate a set of prompts based on their understanding of the intent classification tasks of a deployed dialogue system or the like.

Additionally, or alternatively, S215 may function to generate the set of prompts based on historical or real user queries and/or user commands. In one implementation, S215 may function to randomly sample a predetermined number of user utterances from a deployed system and convert the random samples into prompts for constructing paraphrasing requests for sourcing training data. In another implementation, S215 may function to randomly sample a predetermined number of user utterances from a machine learning test corpus and convert the random samples into prompts for constructing scenario-driven prompts and paraphrasing requests for sourcing training data.

In a first implementation, S215 may function to define training data sourcing parameters comprising a set of prompts for sourcing raw machine learning training data for a classification intent. The set of prompts may define a set of scenarios that enable the generation of raw machine learning data responsive to the scenario. Accordingly, S215 may function to define instructions for a scenario-driven request for raw machine learning training data from a remote crowdsourcing platform or the like. In the scenario-driven approach, the set of prompts describe or include real-world situations or circumstances that requires or prompts responses to the real-world circumstances or situations. The responses to the real-world situation of a prompt preferably comprises raw machine learning training data. Suitably, a scenario-driven prompt functions to simulate real world situations that enable the creation of natural user queries and/or commands (requests) resembling real user queries and/or commands.

In a first variation, S215 may function to define a set of prompts for sourcing raw machine learning training data for an intent classification task may include defining a generic (coarse) scenario in which a broad or general description of a real-world (or similar) situation related to a targeted classification intent without additional instructions constraining a manner in which a response to the scenario may be provided. For example, a generic scenario for a specific intent may be "You want to know about your account balance" and does not include further instructions for guiding and/or providing responses to the generic scenario.

In a second variation, S215 may function to define a set of prompts for sourcing raw machine learning training data for a classification intent may include defining a specific (granular) scenario of a real-world (or similar) situation related to a targeted classification intent in which additional details beyond a generic scenario may be provided to generate responses to the specific scenario with more modifiers or constraints. In some embodiments, a specific scenario may additionally include specific requirements relating to information that is required to be included in a response to the specific scenario. For example, a specific scenario for a specific intent may be "You'd like to know the balance of one of your accounts. (Please specify the account you want to inquire about in your responses)".

Additionally, or alternatively, S215 may function to construct a composition and/or mixture of generic scenarios and specific scenarios for sourcing raw machine learning training data for a specific intent classification task. The composition or mixture may include any suitable ratio between generic and specific scenarios; however, in a preferred embodiment, in an optimal composition or mixture, S215 may function to include a higher ratio of specific scenarios than a ratio of generic scenarios to yield an improved corpus of raw machine learning training data.

In a second implementation, S215 may function to define a set of prompts for sourcing raw machine learning training data for a classification intent may include defining a request or instruction for rephrasing and/or paraphrasing the set of prompts (or statements, sentences, etc.) where the resulting response (i.e., the rephrasing or the paraphrasing) comprises the raw machine learning training data for the classification intent. In some embodiments, S215 may function to construct the set of prompts for the paraphrasing request based on converting one or more scenario-driven prompts. In such embodiments, a scenario-driven prompt may be converted to a user query or a user command that should be rephrased or paraphrased. Accordingly, depending on a source of the scenario-driven prompt, S215 may function to generate one of two types of paraphrasing prompts including one of a generic prompt and a specific prompt.

Additionally, or alternatively, S215 may function to construct a composition and/or mixture of scenario-driven prompts and paraphrasing requests for sourcing raw machine learning training data for a specific intent classification task and/or for any suitable number of intent classification tasks. The composition or mixture of scenario prompts and paraphrasing prompts may include any suitable ratio between scenarios and requests for paraphrasing; however, in a preferred embodiment, in an optimal composition or mixture, S215 may function to include a higher ratio of scenario-driven prompts than a ratio of paraphrasing requests to yield an improved corpus of raw machine learning training data. For example, a composition of training data sourcing prompts may include a predetermined number of prompts in which the scenario-driven prompts make up 60% of the population (or set) and paraphrasing prompts constitute the remaining 40% of the population of training data sourcing prompts.

Accordingly, in one or more embodiments, S215 may function to set a variety of training data sourcing parameters including: [1] a setting a prompt generation source or prompt generation parameters (e.g., selecting test sampled (real) user queries and/or engineered queries) for constructing scenario-driven prompts and paraphrasing prompts; and [2] setting a composition or mixture of training data sourcing prompts (e.g., setting mixture ratios, etc.). As discussed below, the training data sourcing parameters, in some embodiments, may be automatically adjusted or reconfigured according to one or more calculated training data quality metrics and/or thresholds.

In one or more embodiments, S215 may additionally or alternatively function to automatically adjust one or more training data sourcing parameters including prompt generation parameters and a composition or a mixture of training data sourcing prompts based on one or more training data quality metrics and/or training data quality thresholds. In some embodiments, S215 may function to automatically reconfigure training data sourcing parameters based on one or more of calculated coverage metrics of a corpora of raw machine learning training corpora, diversity metrics of the corpora of raw machine learning training data, and/or performance (e.g., accuracy metrics, etc.) metrics of one or more machine learning algorithms trained using the corpora of raw machine learning training data.

Accordingly, if one or more metrics of the corpora of raw machine learning training data do not satisfy one or more training data quality thresholds (e.g., a minimum coverage threshold, a minimum diversity threshold, etc.) and/or if one or more performance metrics of the one or more machine learning algorithms trained using the corpora of training data do no satisfy performance metrics (e.g., accuracy metrics, etc.), S210 may function to automatically adjust or reconfigure one or more training data sourcing parameters to increase/decrease proportions and/or add/remove historical (real) user queries/commands and proportions of engineered user queries/commands in a mixture or composition. S215 may additionally or alternatively automatically adjust prompt generation parameters by increasing/decreasing the historical queries/commands and/or the engineered queries/commands used in constructing prompts.

S215 may additionally or alternatively function to launch one or more requests for machine learning training data to one or more training data sources based on setting the one or more training data sourcing parameters. In some embodiments, the one or more requests for machine learning training data may be provided as input into one or more distinct training data request templates. In such embodiments, the method 200 or a related method or system may function to construct the distinct training data request templates according to a configuration of each of the one or more training data sources.

S215 may additionally or alternatively function to collect raw machine learning training data from the one or more training data sources in response to the one or more requests for machine learning training data. In a preferred embodiment, the machine learning training data from each of the training data sources comprise a plurality of labeled training data samples proliferated based on or using the training data sourcing parameters. Accordingly, the machine learning training data returned from the one or more training data sources may include a large number (e.g., hundreds, thousands, millions, etc.) of labeled training data samples that are variants of the paraphrasing prompts or responsive to the scenario-driven prompts.

2.3 Calculating Efficacy Metrics for the Machine Learning Training Data

S220, which includes measuring one or more efficacy metrics of a corpora of raw machine learning training data, functions to evaluate one or more training data acquisition methods and one or more quality or efficacy metrics of each distinct corpus of raw machine learning training data. As described herein, a training data collection method may include one or more methods by which parameters for sourcing machine learning training data are configured and/or constructed including, for example, a construction of scenario-driven prompts and/or paraphrasing-driven prompts and/or a setting of a composition of a mixture of these distinct types of prompts.

Figure 4:
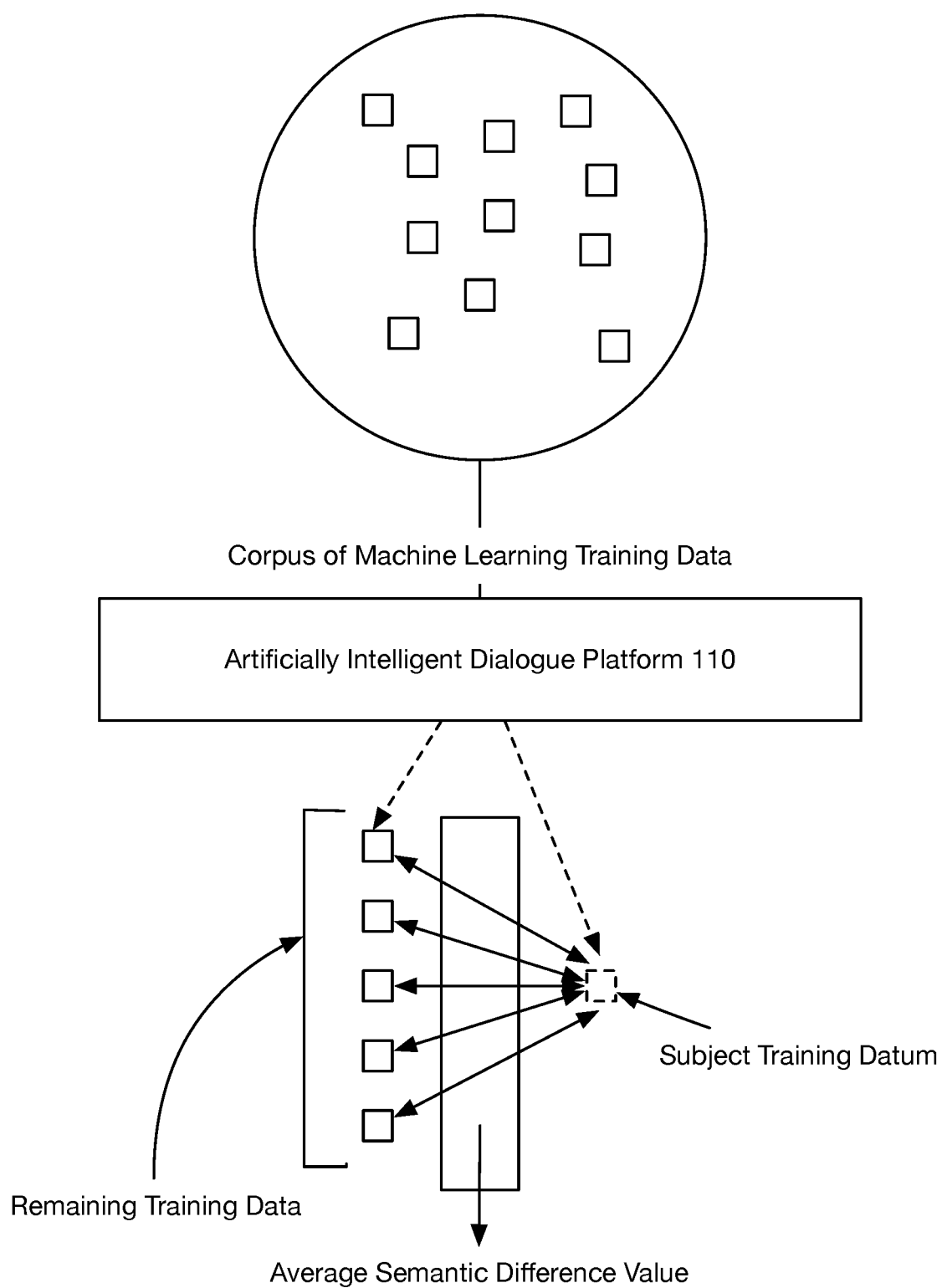
FIG. 4 illustrates a schematic representation of a system and process for determining a diversity of machine learning training data in accordance with one or more embodiments of the present application.

In a first implementation, S220 may function to evaluate and/or measure a diversity metric of each distinct corpus within a corpora of raw machine learning training data and correspondingly, generate an aggregate diversity metric value for the corpora of raw machine learning training data, as shown by way of example in FIG. 4. In general, a diversity metric, as referred to herein, preferably provides a measure indicating a level of heterogeneity among raw machine learning training data (e.g., between training sentences of a single corpus) of a distinct corpus. Additionally, or alternatively, the diversity metric may also provide a measure indicating a level of heterogeneity of an entire corpora of raw machine learning training data, which may include a plurality of distinct corpus of raw machine learning training data for a plurality of distinct intent classification tasks or the like. That is, a diversity metric may be additionally calculated between two or more distinct corpus of a corpora of raw machine learning training data.

In an evaluation of each distinct corpus of raw machine learning training data, S220 may function to construct a plurality of diversity pairwise comparisons between the training data within the distinct corpus of raw machine learning training data. In a preferred embodiment, each training datum within the distinct corpus comprises a training sentence or the like and in such preferred embodiment, S220 may function to generate diversity pairwise comparisons between a selected training datum or selected training sentence within the distinct corpus and each of the remaining training data or training sentences within the distinct corpus.

Accordingly, for each diversity pairwise elements (or diversity pair) comprising sentences a and b that is evaluated from a distinct corpus of raw machine learning training data, S220 may function to calculate the reverse of the mean Jaccard Index between the sentences a and b n-grams sets:

Where N is the maximum n-gram length, which may be 3 or any suitable value. Accordingly, the evaluation in S220 may function to calculate a semantic difference value for each diversity pairwise elements from the distinct corpus. In some embodiments, the semantic difference value for a given diversity pairwise elements may sometimes be referred to herein as a (diversity) pairwise score. Thus, S220 may function to calculate a diversity pairwise score for each pairing of a selected sentence from the distinct corpus of machine learning training data and the other remaining sentences in the distinct corpus of machine learning training data. For example, a distinct corpus of machine learning training data may include four training sentences [X1, X2, X3, and X4] with sentence X2 being an initially selected sentence for diversity pairwise scoring. In such example, a diversity pairwise scoring value may be produced for each of the pairings including [X2, X1], [X2, X3], and [X2, X4]. A similar pairwise scoring may be produced for each of the remaining sentences in the corpus of machine learning training data (e.g., when X3 is the selected sentence [X3, X1], [X3, X2], and [X3, X4], etc.) until all of the training sentences have been compared and distinct pairwise score values created for each diversity pair.

Accordingly, S220 may function to generate a diversity pairwise score (i.e., D (a, b)) for each of the training datum pairings of a distinct corpus. Once S220 has generated a pairwise score for each of the possible pairwise combinations in a distinct corpus of machine learning training data, S220 may additionally or alternatively generate a corpus diversity score value for the distinct corpus of machine learning training data. In some embodiments, the corpus diversity score value may be calculated by summing all diversity pairwise scores for each possible sentence pairing combination of a distinct corpus and dividing the sum of all diversity pairing scores by the number of sentence pairing combinations of the distinct corpus. In some embodiments, the diversity pairwise score D (a, b)=D (b, a) and thus, while D (a, b) and D (b, a) may appear to be distinct diversity pairwise scorings, S220 may function to count only once the diversity score associated with each of D (a, b) and D (b, a) to avoid duplicating a same diversity pairwise scoring for a previous or essentially same diversity pairwise comparison.

Preferably, S220 functions to calculate a corpus diversity pairwise score for each of a plurality of distinct corpus of a corpora of raw machine learning training data. For instance, if the corpora of raw machine learning training data is sourced for 47 distinct classification intents, then the corpora should include 47 distinct corpus of raw machine learning data and thus, S220 may function to calculate 47 disparate corpus diversity pairwise values. For example, S220 may function to calculate an aggregate diversity pairwise score across all intent classifications of a corpora of machine learning training data with the following formula:

Accordingly, S220 may function to compute an average corpus diversity score over all sentence pairs within a distinct corpus (e.g., classification intent training data) of machine learning training data, then average across the plurality of distinct corpus of machine learning training data of a corpora; where I may be the set of classification intents or intent classification tasks (performable by a deployed dialogue system) and $X_i$, may be the set of individual training datum (e.g., training sentences) labelled with a specific classification intent i in the corpora of raw machine learning training data (e.g., the entire training set).

In this first implementation, S220 may function to store calculated corpus diversity scores in association with each respective distinct corpus of machine learning training data of a corpora of raw machine learning training data. S220 may additionally function to store the aggregate diversity score in association with the corpora of raw machine learning training data.

Figure 5:
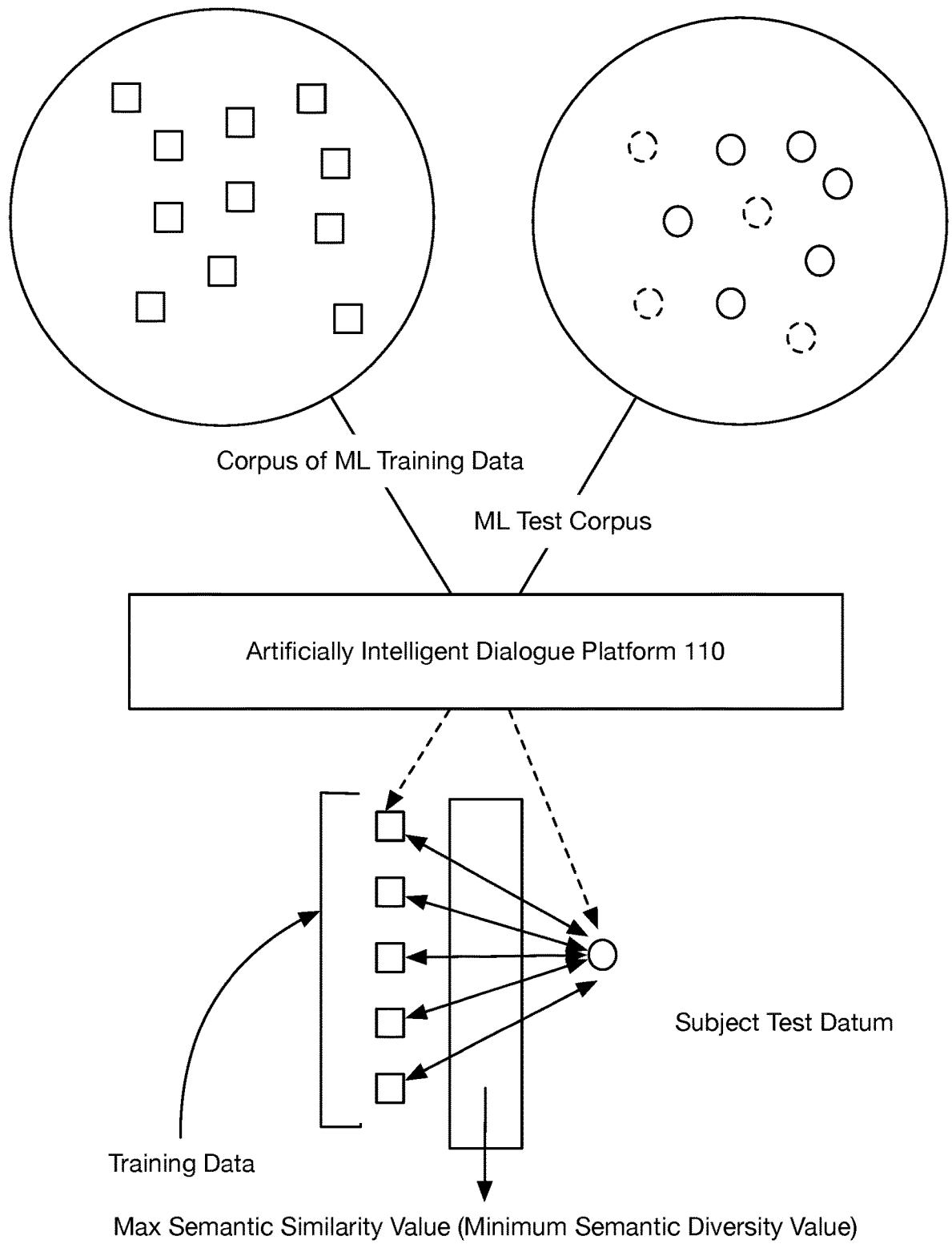
FIG. 5 illustrates a schematic representation of a system and process for determining a coverage of machine learning training data in accordance with one or more embodiments of the present application.

In a second implementation, S220 may function to additionally or alternatively evaluate and/or measure a coverage metric for each distinct corpus of machine learning training data within a corpora of raw machine learning training data and correspondingly, generate an aggregate coverage metric value for the corpora of raw machine learning training data, as shown by way of example in FIG. 5. In general, a coverage metric, as referred to herein, preferably provides a measure indicating how well or a level to which a machine learning training dataset covers a complete space (or universe) of different ways an intent (classification intent) can be expressed (by a user or the like of an automated dialogue or conversational system). In regards to a distinct corpus of machine learning training data associated with a classification intent i, a calculated coverage metric for the distinct corpus indicates how well the training data within the distinct corpus covers (or overlaps) with all potential ways of expressing the classification intent i. Accordingly, in one or more embodiments, the coverage metric may provide a measure indicating how well or how much (or to what degree) the training data within the distinct corpus covers (or overlaps) a machine learning test corpus. The coverage metric value may be expressed in any suitable manner or value within a predefined range of values including, but not limited to, as a numeric value (e.g., a percentage, 0%-100%, etc.), as a character value, a grade value (e.g., A, B, C . . . within A-E range), a level value (e.g., levels 1-10, etc.), and the like.

As background, when it is desired that a performance of a machine learning model (e.g., classification model, inference model, etc.) be improved, there may be two general approaches which involve improving the model, per se, and inference algorithm and/or improving the training data used to train the model. However, in modern machine learning model evaluation, there does not exist a technique to differentiate whether it is the model and algorithm that should be improved and/or the training data. Accordingly, the coverage metric provides an algorithm-independent and/or algorithm-agnostic technique to evaluate how well machine learning training data represents the space of possibilities for a given classification task of a machine learning model. In this way, a quality of the machine learning training data may be known in advance of (time and computing resource consuming) training of a machine learning model and therefore, a point of performance improvement for a given machine learning model may be clarified and/or determined in advance of training based on whether the coverage metric for a given corpus of machine learning training data satisfies a quality threshold or quality standard for training and improving the given machine learning model.

Similar to the first implementation, in an evaluation of the coverage metric for each distinct corpus of raw machine learning training data, S220 may function to construct a plurality of diversity pairwise comparisons between a machine learning test corpus and the distinct corpus of raw machine learning training data to determine for each test element (e.g., test sentence or the like) within the machine learning test corpus which training datum element in the distinct corpus has a greatest similarity to each test element of the test corpus. S220 may function to generate diversity pairwise comparisons between a selected test element or a selected test sentence from the machine learning test corpus and each of the training datum elements within the distinct corpus of machine learning training data for calculating a coverage value (diversity pairwise score) for the distinct corpus of machine learning training data.

Accordingly, S220 may function to calculate a semantic similarity value that indicates how similar a test sentence is to a training sentence or the like. S220 may function to identify for each test element within the test corpus which training datum (or training sentence) has the greatest semantic similarity. Stated differently, S220 may function to identify for each test element of the test corpus which of the training datum of a distinct corpus of machine learning training data has the least or minimal diversity pairwise score or value (indicating the greatest similarity resulting from a small diversity or semantic difference between the test element and training datum) and associate the identified minimal diversity pairwise score or coverage value to the subject test element from the test corpus. Accordingly, the coverage value or score for a given test sentence of a machine learning test corpus may be defined as the minimum diversity pairwise score calculated between the given sentence and each of the training sentences of a distinct corpus of machine learning training data.

In this second implementation, to calculate an aggregate coverage metric value for the corpora of raw machine learning training data, S220 may function to collect the lowest diversity pairwise score for each test element of a test corpus associated with a classification intent i, sum the lowest diversity pairwise scores, and calculate an average diversity pairwise score (or average coverage score) for the machine learning test corpus. S220 may function to perform this step for each of the plurality of machine learning test corpus of a corpora of machine learning test corpus. Subsequently, S220 may function to calculate the aggregate coverage metric value for the corpora of machine learning test corpus by summing the average coverage scores from each of the plurality of machine learning test corpus and dividing the aggregate average coverage score by the total number of classification intents represented in the corpora of raw machine learning training data or by the total number of machine learning test corpus within the corpora of machine learning test corpus. For example, coverage for a corpora of raw machine learning training data X and a corpora of machine learning test corpus Y may be represented as follows:

$$CVG(X, Y) = \frac{1}{|I|} \sum_{i \in I}^{I} \frac{1}{|Y_i|} \sum_{b}^{Y_i} \max_{a} x_i (1 - D(a, b))$$

Where I represents a set of classification intents and $X_i$, may represent a training datum (e.g., utterances, sentences, etc.) labelled with the classification intent i within the corpora of raw machine learning training data labeled with classification intent i and $Y_i$, may represent a test corpus datum (e.g., utterances, sentences, etc.) labelled with the classification intent i within a corpora of machine learning test corpus.

2.4 Measuring Accuracy

S230, which includes measuring an accuracy of a set of machine learning models, functions to identify a set of machine learning models selected from a random spectrum of machine learning models and measuring accuracy values for each of the machine learning models in the set. That is, in S230, random machine learning models may be selected for measuring classification accuracy thereof after being trained with the corpora of raw machine learning training data. In some embodiments, the set of machine learning models in the accuracy testing set may be selected across a broad spectrum of machine learning models ranging from traditional and/or well-known machine learning models to state of the art or recently developed machine learning models. A technical purpose of selecting the testing set of machine learning models across a broad spectrum of machine learning models may be to enable the quality evaluation method of the corpora of raw machine learning training data to be algorithm agnostic.

For each machine learning model in the accuracy testing set, S230 may function to train the respective model using the corpora of raw machine learning training data. In some embodiments, S230 may function to selectively train the respective models using distinct corpus of machine learning training data from the corpora associated with a specific classification intent rather than the entire corpora in order to selectively train the models to classify for a specific intent and correspondingly, test an accuracy of the specifically-trained machine learning classifier.

Once each of the machine learning algorithms in the accuracy test set is trained using the corpora of raw machine learning training data, S230 may function to measure and/or test an accuracy of each trained machine learning algorithm of the accuracy test set against a corpora of machine learning test corpus. Thus, each of the trained machine learning models of the test accuracy set may be trained with a common corpora of machine learning training data and similarly, tested against a common corpora of machine learning test corpus.

Accordingly, S230 may function to collect classification accuracy metrics for each of the trained machine learning algorithm of the accuracy test set. In some embodiments, S230 may function to evaluate the classification accuracy metrics against one or more performance thresholds and/or accuracy thresholds. In some embodiments, if the classification accuracy metrics do not satisfy or meet the one or more performance thresholds and/or accuracy thresholds, S230 may function to generate a signal for automatically reconfiguring or adjusting one or more training data sourcing parameters.

2.5 Tuning Training Data Sourcing Method

Optionally or additionally, S240, which includes tuning one or more parameters of a machine learning training data sourcing technique, functions to tune or reconfigure one or more sourcing parameters for obtaining machine learning training data based on one or more of a measured coverage metric value and a measured diversity metric value and in some embodiments, relative to a calculated accuracy metric value associated with the testing accuracy set of machine learning models.

In some embodiments, if a measured diversity metric value of the corpora of raw machine learning training data does not satisfy a stabilization threshold and a measured accuracy metric value of the accuracy test set of machine learning models also does not satisfy a minimal (or optimal) accuracy threshold, S240 may function to trigger a tuning of one or more parameters for sourcing machine learning training data that enables an increase a size of the corpora of raw machine learning training data obtained from the one or more training data sources. Additionally, or alternatively, S240 may function to trigger the tuning of the one or more parameters for sourcing machine learning training data based on the diversity metric values alone. In such embodiments, if the diversity metric value does not meet or satisfy a minimum diversity value threshold, S240 may function to reconfigure or tune the training data sourcing parameters to increase a possibility of obtaining additional and/or variant machine learning training data sufficient to increase a calculated diversity metric value for a corpora of raw machine learning training data. It shall be noted that in some embodiments the minimum diversity value threshold and the stabilization threshold may be the same or overlap; however, in other embodiments, the minimum diversity value threshold may be a lower threshold than the stabilization threshold as the stabilization threshold may sometimes represent an optimal or near optimal value of diversity where increases in a diversity of a corpora of raw machine learning data may not increase or marginally increase with the addition of more training data to the corpora.

In some embodiments, if [i] a measured diversity metric value of the corpora of raw machine learning training has satisfied or met a stabilization threshold, [ii] a measured accuracy metric value of the accuracy test set of machine learning models also does not satisfy a minimal (or optimal) accuracy threshold, and [iii] a measured coverage metric value of the corpora of raw machine learning training data has not satisfied or met a coverage stabilization threshold, S240 may function to trigger a tuning of one or more parameters for configuring a mixture of a set of prompts used for sourcing the corpora of raw machine learning training data. That is, even if a diversity metric value of a corpora of raw machine learning training data has reached an optimal or substantially optimal value, a quality of the corpora machine learning training data may be improved, in some embodiments, if the coverage metric value has not stabilized or plateaued, which may signal to the method 200 (and/or system 100) that one or more aspects of the data collection technique (S210-S220) beyond a size of the corpora of raw machine learning training data may be tuned to achieve a higher quality of training data that enables a better performance of the machine learning models in the accuracy testing set. Namely, one or more configuration parameters associated with defining the mixture of scenario-driven and paraphrasing prompts may be adjusted and/or one or more configuration parameters relating to a source (e.g., test sampling of real queries or selecting engineered queries) of the scenarios and paraphrasing prompts of the mixture may be adjusted or tuned to improve a quality of the training data that is collected and correspondingly, improve a performance of the machine learning models trained with the collected corpora of raw machine learning training data.

2.6 Processing Training Data

S250, which includes processing the corpora of raw machine learning training data to a suitable form for training one or more machine learning algorithms of a live dialogue system, functions to assess and refine (if necessary) the corpora of raw machine learning training data based on one or more of the training data quality metrics including, but not limited to, associated coverage metric values and diversity metric values.

In a preferred embodiment, S250 may function to implement a predefined training data processing algorithm that includes calculating a fit score for each of the training data, ranking/rating the training data, pruning the training data, and the like. The fit score may be any numeric or character value or descriptive value of a predefined range (e.g., 0-100, A-E, 0%-100% low to high, etc.).

The calculated first score for each of the element of training data in a corpus may generally represents a likelihood that given training data may improve an accuracy (inferential accuracy, classification accuracy, or the like) of a given machine learning model. In some embodiments, a fit score for an element of training data may be calculated based on average diversity metric values and/or average cover metric values for the element of training data. Thus, in one implementation, the fit score may be based on and/or equivalent to an average coverage metric value for a given element of training data. In a second implementation, the fit score may be based on and/or equivalent to an average diversity metric value for a given element of training data. In a third implementation, the fit score for a given element of training data may be based on and/or equivalent to a combination of an average coverage metric value and an average diversity metric value for a given element of training data.

Additionally, or alternatively, the fit score may be calculated based on the text of a given element of training data matching or substantially matching a text or a meaning of a text of a pre-existing machine learning training data stored in a reference list or database of a machine learning model.

Using the processing algorithm, S250 may function to rate and/or rank each training data of a (distinct) corpus of machine learning training data according to their respective fit score (e.g., average coverage metric value, average diversity metric value, etc.). Specifically, S250 may function to use the calculated fit score to generate a rating for each training data.

Accordingly, based on a rating and/or a fit score calculated for each of the training data samples, S250 may function to rank order each of the training data of a distinct corpus of machine learning training data in descending or ascending ranking order.

Additionally, or alternatively, S250 may function to apply one or more predefined pruning thresholds to a (ranked/unranked or ordered/unordered) list of training data of a corpus of machine learning training data. Preferably, S250 applies the pruning threshold to the list of training data after the training data have been rated and/or ranked. The pruning threshold preferably relates to or includes a pruning value, which may be a minimum required rating value (or fit score) and/or minimum required ranking value. In one example, S250 may function to prune (e.g., remove or discard) from a list of training data any training data having a fit score or rating below 20 (on a scale of 0-100). Additionally, or alternatively, S250 may function to prune from a list of training data any training data that is ranked below 80% (or any suitable value) of candidate training data in a list of training data. In some embodiments, candidate training data that are scheduled to be pruned are flagged and may additionally be sent to a disparate review queue for manual review. In some embodiments, candidate training data that have been identified for pruning may be automatically pruned from a list of candidate training data after an expiry of a predetermined time period.

S250 may additionally or alternatively enable an administrator to manually inspect training data samples collected from the plurality of external training data sources and selectively prune undesirable training data therefrom. In this regard, S250 may enable an administrator to flag one or more of the training data for deletion or inactivation.

2.7 Deploying Machine Learning Training Data

S260, which includes deploying the corpora of machine learning training data, functions to load the corpora of machine learning training data collected from the plurality of external training data sources into one or more active or live machine learning models of an artificially intelligent dialogue system (or any suitable deployed or online system implementing machine learning models). Preferably, S260 may function to automatically load (e.g., assimilate, integrate, etc.) the corpora of machine learning training data into an active machine learning model only after training data processing algorithm (as described in S250) has been completely applied to the corpora of machine learning training data. In some embodiments, S260 may function to automatically load the corpora of machine learning training data if one or more of an aggregate coverage metric value and an aggregate diversity metric value for the corpora of machine learning data satisfies one or more training data quality thresholds.

In some embodiments, S260 may function to deploy a partial corpora of machine learning training data as the training data is populated by the one or more external training data sources and/or processed according to one or more steps in S250. Thus, in the circumstance when a full list of training data has not been provided by one or more external training data sources and/or the one or more external training data sources may be slow to provide training data, S260 may function to deploy a partial list of training data into a live machine learning model.

Additionally, or alternatively, S260 may function to test the performance of a machine learning model based on a deployed corpora of machine learning training data. S260 may function to measure one or more operational or performance metrics of the machine learning model and in the case, that the operational metrics of the machine learning have declined since the deployment of the corpora of machine learning training data, S260 may function to revert the machine learning model back by removing the corpora of machine learning training data from a reference database of the machine learning model.

Additionally, or alternatively, S260 may function to simulate how a machine learning model would have performed based on historical operational and/or use data of the corpora of machine learning training data. In this way, S260 may determine a simulated level of accuracy or other operational metrics of the machine learning model without the risk of deploying the corpora of machine learning training data into the live machine learning model. Thus, if the corpora of machine learning training data is poor or of low training quality (e.g., below a minimum training data quality threshold), S260 may function to reevaluate or discard the corpora of machine learning training data.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system for intelligently identifying machine learning training data for implementing a machine learning-based dialogue service, the system comprising:
   one or more sources of machine learning training data;
   one or more hardware computing servers implementing a machine learning-based dialogue service that:
   constructs a corpora of machine learning test corpus that comprise a plurality of historical queries and/or historical commands test-sampled from one or more production logs of a deployed dialogue system, the corpora of machine learning test corpus relates to a baseline set of user queries and/or user commands used in calculating efficacy metrics of raw machine learning data;
   configures one or more training data sourcing parameters to source a corpora of raw machine learning training data from the one or more sources of machine learning training data;
   obtains, from the one or more sources of machine learning training data, the corpora of raw machine learning training data based on the one or more training data sourcing parameters;
   calculates, using the one or more hardware computing servers, efficacy metrics of the corpora of raw machine learning training data, wherein calculating the efficacy metrics includes:
   using the corpora of machine learning test corpus to calculate a coverage metric value that indicates a degree to which the corpora of raw machine learning training data represents possibilities of expressing a target classification intent of the corpora of machine learning test corpus;
   calculating the coverage metric value for each of a plurality of distinct corpus of machine learning training data within the corpora of raw machine learning training data, wherein calculating the coverage metric value for each of the plurality of distinct corpus of machine learning training data includes:
   [i] selecting a subject test corpus datum from within a subject distinct machine learning test corpus of the corpora of machine learning test corpus;
   [ii] constructing a plurality of diversity pairwise comprising the subject test corpus datum and each training data within a subject distinct corpus of machine learning training data of the corpora of raw machine learning training data;

[iii] calculating a semantic similarities value of each of the plurality of diversity pairwise involving the subject test corpus training datum;

[iv] identifying a minimum diversity metric value for the subject test corpus datum based on the semantic similarities value of each of the plurality of diversity pairwise involving the subject test corpus training datum;

[v] calculating a minimum diversity metric value for each remaining test corpus datum within the subject distinct machine learning test corpus; and

[vi] calculating the coverage metric value for the subject distinct corpus of machine learning training data based on the minimum diversity metric value for the subject test corpus datum and for each of the remaining test corpus datum of the subject distinct machine learning test corpus;

calculating the coverage metric value for the corpora of raw machine learning training data based on the coverage metric value for each of the plurality of distinct corpus of machine learning training data within the corpora;

identifies whether to train at least one machine learning classifier of the machine learning-based dialogue system using the corpora of raw machine learning training data based on whether the calculated coverage metric value satisfies a predetermined coverage metric threshold.

2. The system according to claim 1, wherein calculating the efficacy metrics includes calculating a diversity metric value of the corpora of raw machine learning training data.

3. The system according to claim 1, wherein the machine learning-based dialogue service further:
uses the corpora of raw machine learning training data, as machine learning training input, to train the at least one machine learning classifier if a calculated coverage metric value of the corpora of machine learning training data satisfies a minimum coverage metric threshold.

4. The system according to claim 3, wherein the machine learning-based dialogue service further:
responsive to training the at least one machine learning classifier using the corpora of raw machine learning training data, deploys the at least one machine learning classifier into a live implementation of the artificially intelligent dialogue system.

5. The system according to claim 1, wherein the machine learning-based dialogue service calculates the coverage metric value of the corpora of raw machine learning training data according to the following equations:

$$D(a, b) = 1 - \sum_{n=1}^{N} \frac{|n\text{-}grams_a \cap n\text{-}grams_b|}{|n\text{-}grams_a \cup n\text{-}grams_b|}$$

where: N is a maximum n-gram length, a is a first sentence in a diversity pairwise comparison, b is a second sentence in the diversity pairwise, D is the reverse of the mean Jaccard Index between the sentences a and b n-gram sets, and $$CVG(X, Y) = \frac{1}{|I|} \sum_{i \in I}^{I} \frac{1}{|Y_i|} \sum_{b}^{Y_i} \max_{a}^{X_i}(1 - D(a, b))$$

where: I is a set of classification intents, Xi is a set of training datum labeled with the classification intent i within the corpora of raw machine learning training data X, and Yi is a test corpus datum labelled with the classification intent i within the corpora of machine learning test corpus, CVG is the coverage for the corpora of raw machine learning training data X and the corpora of machine learning test corpus Y.

6. The system according to claim 1, wherein
analyzing the efficacy metrics of the corpora of raw machine learning training data includes:
calculating a diversity metric value for each of a plurality of distinct corpus of machine learning training data within the corpora of raw machine learning training data, wherein the diversity metric value relates to a measure indicating a level of heterogeneity among machine learning data within a distinct corpus of machine learning training data; and
calculating an aggregated diversity metric value for the corpora of raw machine learning training data based on the diversity metric value for each of the plurality of distinct corpus of machine learning training data within the corpora.

7. The system according to claim 6, wherein
the machine learning-based dialogue service calculates the diversity metric value of the corpora of raw machine learning training data according to the following equations:

$$D(a, b) = 1 - \sum_{n=1}^{N} \frac{|n\text{-}grams_a \cap n\text{-}grams_b|}{|n\text{-}grams_a \cup n\text{-}grams_b|}$$

where: N is a maximum n-gram length, a is a first sentence in a diversity pairwise comparison, b is a second sentence in the diversity pairwise, D is the reverse of the mean Jaccard Index between the sentences a and b n-gram sets, and $$DIV(X) = \frac{1}{|I|} \sum_{i \in I}^{I} \frac{1}{|X_i|^2} \left[ \sum_{a}^{X_i} \sum_{b}^{Y_i} D(a, b) \right]$$

where: I is a set of classification intents, Xi is a set of training datum labeled the classification intent i within the corpora of raw machine learning training data X and DIV is the diversity of the corpora of raw machine learning training data X.

8. The system according to claim 1, wherein:
the corpora of machine learning test corpus is defined by a plurality of distinct machine learning test corpus,
each of the plurality of distinct machine learning test corpus is associated with a distinct intent classification task of the machine learning-based dialogue service, and
each of the plurality of distinct machine learning test corpus includes at least one subset of the plurality of historical queries and/or historical commands obtained from a deployed dialogue system.

9. The system according to claim 1, wherein
the machine learning-based dialogue service further constructs the corpora of machine learning test corpus using a plurality of engineered queries and/or engineered commands, and
each of the plurality of engineered queries and/or engineered commands is artificially generated for one or more identified intent classification tasks.

10. The system according to claim 1, wherein
configuring the one or more training data sourcing parameters includes:
generating a plurality of distinct sets of prompts for sourcing raw machine learning training data for each of a plurality of intent classification tasks of the machine learning-based dialogue service.

11. The system according to claim 10, wherein:
generating the plurality of distinct sets of prompts is based on a plurality of historical user queries and/or a plurality of historical user commands,
generating the plurality of distinct sets of prompts includes:
test sampling by the machine learning-based dialogue service the plurality of historical user queries and/or the plurality of historical user commands from one or more production logs of a deployed dialogue system, and
converting the plurality of historical user queries and/or the plurality of historical user commands into the set of prompts for sourcing raw machine learning training data.

12. The system according to claim 10, wherein
the plurality of distinct sets of prompts comprises a combination of:
a plurality of scenario-driven prompts, wherein each of the plurality of scenario-driven prompts describes a real-world circumstance for which a response is required; and
a plurality of paraphrasing requests, wherein each of the plurality of paraphrasing requests includes an instruction to rephrase and/or paraphrase a given prompt or a given statement.

13. The system according to claim 12, wherein:
the machine learning-based dialogue service constructs a composition of the plurality of distinct sets of prompts to include a predetermined ratio of scenario-driven prompts to paraphrasing requests, and
a number of the plurality of scenario-driven prompts in the predetermined ratio of scenario-driven prompts is greater than a number of the plurality of the paraphrasing requests.

14. The system according to claim 1, further comprising:
calculating by the machine learning-based dialogue service:
an aggregated coverage metric value for the corpora of raw machine learning training data, wherein calculating the aggregated diversity metric includes:
calculating an average coverage metric value by calculating a sum of the coverage metric value for each of the plurality of distinct corpus of machine learning training data that defines the corpora and dividing the sum by a number of the distinct corpus of machine learning training data within the corpora.

15. The system according to claim 7, wherein
calculating the diversity metric value for each of the plurality of distinct corpus of machine learning training data includes:
[i] selecting a subject training datum from training data within a subject distinct corpus of machine learning training data of the plurality of distinct corpus of machine learning training data;
[ii] constructing a plurality of diversity pairwise comprising the subject training datum and each of a remaining training data within the subject distinct corpus of machine learning training data;
[iii] calculating a semantic difference value of each of the plurality of diversity pairwise involving the subject training datum;
[iv] calculating a specific diversity metric value for the subject training datum based on an average of the semantic difference value of each of the plurality of diversity pairwise involving the subject training datum;
[v] calculating a specific diversity metric value for each of the remaining training data within the subject distinct corpus of machine learning training data; and
[vi] calculating the diversity metric value for the subject distinct corpus of machine learning training data based on the specific diversity metric value for the subject training datum and for each of the remaining training data of the subject distinct corpus of the machine learning training data.

16. A method for intelligently curating machine learning training data for implementing a machine learning-based dialogue service, the method comprising:
a machine learning-based dialogue service implemented by one or more hardware computing servers:
constructing a corpora of machine learning test corpus that comprise a plurality of historical queries and/or historical commands test-sampled from one or more production logs of a deployed dialogue system, the corpora of machine learning test corpus relates to a baseline set of user queries and/or user commands used in calculating efficacy metrics of raw machine learning data;
configuring one or more training data sourcing parameters to source a corpora of raw machine learning training data from the one or more sources of machine learning training data;
obtaining, from the one or more sources of machine learning training data, the corpora of raw machine learning training data based on the one or more training data sourcing parameters;
calculating, using the one or more hardware computing servers, efficacy metrics of the corpora of raw machine learning training data, wherein calculating the efficacy metrics includes:
using the corpora of machine learning test corpus to calculate a coverage metric value that indicates a degree to which the corpora of raw machine learning training data represents possibilities of expressing a target classification intent of the corpora of machine learning test corpus;
calculating the coverage metric value for each of a plurality of distinct corpus of machine learning training data within the corpora of raw machine learning training data;
calculating the coverage metric value for the corpora of raw machine learning training data based on the coverage metric value for each of the plurality of distinct corpus of machine learning training data within the corpora; and wherein the machine learning-based dialogue service calculates the coverage metric value of the corpora of raw machine learning training data according to:

$$D(a, b) = 1 - \sum_{n=1}^{N} \frac{|n\text{-}grams_a \cap n\text{-}grams_b|}{|n\text{-}grams_a \cup n\text{-}grams_b|}$$

where: N is a maximum n-gram length, a is a first sentence in a diversity pairwise comparison, b is a second sentence in the diversity pairwise, D is the reverse of the mean Jaccard Index between the sentences a and b n-gram sets, and $$CVG(X, Y) = \frac{1}{|I|} \sum_{i \in 1}^{I} \frac{1}{|Y_i|} \sum_{b}^{Y_i} \max_{a}^{X_i} (1 - D(a, b))$$

where: I is a set of classification intents, Xi is a set of training datum labeled with the classification intent i within the corpora of raw machine learning training data X, and Yi is a test corpus datum labelled with the classification intent i within the corpora of machine learning test corpus, CVG is the coverage for the corpora of raw machine learning training data X and the corpora of machine learning test corpus Y; and identifying whether to train at least one machine learning classifier of the machine learning-based dialogue system using the corpora of raw machine learning training data based on whether the calculated coverage metric value satisfies a predetermined coverage metric threshold.

17. A method for intelligently curating machine learning training data for implementing a machine learning-based dialogue service, the method comprising:

a machine learning-based dialogue service implemented by distributed network of computers:

configuring one or more training data sourcing parameters to source a corpora of raw machine learning training data from the one or more sources of machine learning training data;

obtaining, from the one or more sources of machine learning training data, the corpora of raw machine learning training data based on the one or more training data sourcing parameters;

calculating, using the one or more hardware computing servers, efficacy metrics of the corpora of raw machine learning training data, wherein calculating the efficacy metrics includes using a corpora of machine learning test corpus to calculate a coverage metric value that indicates a degree to which the corpora of raw machine learning training data represents possibilities of expressing a target classification intent of the corpora of machine learning test corpus;

calculating the coverage metric value for each of a plurality of distinct corpus of machine learning training data within the corpora of raw machine learning training data;

calculating the coverage metric value for the corpora of raw machine learning training data based on the coverage metric value for each of the plurality of distinct corpus of machine learning training data within the corpora; and wherein the machine learning-based dialogue service calculates the coverage metric value of the corpora of raw machine learning training data according to:

$$D(a, b) = 1 - \sum_{n=1}^{N} \frac{|n\text{-}grams_a \cap n\text{-}grams_b|}{|n\text{-}grams_a \cup n\text{-}grams_b|}$$

where: N is a maximum n-gram length, a is a first sentence in a diversity pairwise comparison, b is a second sentence in the diversity pairwise, D is the reverse of the mean Jaccard Index between the sentences a and b n-gram sets, and $$CVG(X, Y) = \frac{1}{|I|} \sum_{i \in 1}^{I} \frac{1}{|Y_i|} \sum_{b}^{Y_i} \max_{a}^{X_i} (1 - D(a, b))$$

where: I is a set of classification intents, Xi is a set of training datum labeled with the classification intent i within the corpora of raw machine learning training data X, and Yi is a test corpus datum labelled with the classification intent i within the corpora of machine learning test corpus, CVG is the coverage for the corpora of raw machine learning training data X and the corpora of machine learning test corpus Y; and identifying whether to train at least one machine learning classifier of the machine learning-based dialogue system using the corpora of raw machine learning training data based on whether the calculated coverage metric value satisfies a predetermined coverage metric threshold.

* * * * *